United States Patent
Konno

[11] Patent Number: 5,917,802
[45] Date of Patent: Jun. 29, 1999

[54] CLAMP CENTERING DEVICE OF AN OPTICAL DISC PLAYER

[75] Inventor: Youichi Konno, Saitama-ken, Japan

[73] Assignee: Pioneer Electronic Corporation, Tokyo, Japan

[21] Appl. No.: 08/843,444

[22] Filed: Apr. 16, 1997

[30] Foreign Application Priority Data

Apr. 16, 1996 [JP] Japan ................................ 8-118349

[51] Int. Cl.[6] .......................... G11B 25/04; G11B 17/00; G11B 17/28
[52] U.S. Cl. .......................... 369/271; 369/270; 369/264
[58] Field of Search ................................ 369/270, 271, 369/264; 360/98.08, 99.05, 99.12

[56] References Cited

U.S. PATENT DOCUMENTS

| | | | |
|---|---|---|---|
| 5,006,945 | 4/1991 | Furusawa | 360/99.12 |
| 5,050,159 | 9/1991 | Kenmotsu | 369/270 |
| 5,121,379 | 6/1992 | Funabashi et al. | 369/270 |
| 5,208,798 | 5/1993 | Funabashi et al. | 369/270 |

FOREIGN PATENT DOCUMENTS

| | | |
|---|---|---|
| 3-203065 | 9/1991 | Japan . |
| 6-318356 | 11/1994 | Japan . |
| 7-182754 | 7/1995 | Japan . |

*Primary Examiner*—William J. Klimowicz
*Attorney, Agent, or Firm*—Nikaido, Marmelstein, Murray & Oram, LLP

[57] ABSTRACT

An adhered double-sided optical disc is formed by adhering a first disc and a second disc with each other at both sides. The device has a turntable secured to a rotating shaft, a clamper for clamping the double-sided optical disc together with the turntable, and a centering hub mounted on the rotating shaft. The centering hub has a first engaging cylindrical portion and a second engaging cylindrical portion surface of which is located axially inside the first engaging cylindrical portion. Each of both of the engaging cylindrical portions has a diameter so as to be engaged with an inside wall of a center hole of each of the first and second discs. An inclining angle ($\alpha$) of the first engaging cylindrical portion with respect to a vertical plane to an axis of the centering hub is larger than an inclining angle ($\beta$) of the second engaging cylindrical portion with respect to the vertical plane to the axis.

5 Claims, 4 Drawing Sheets

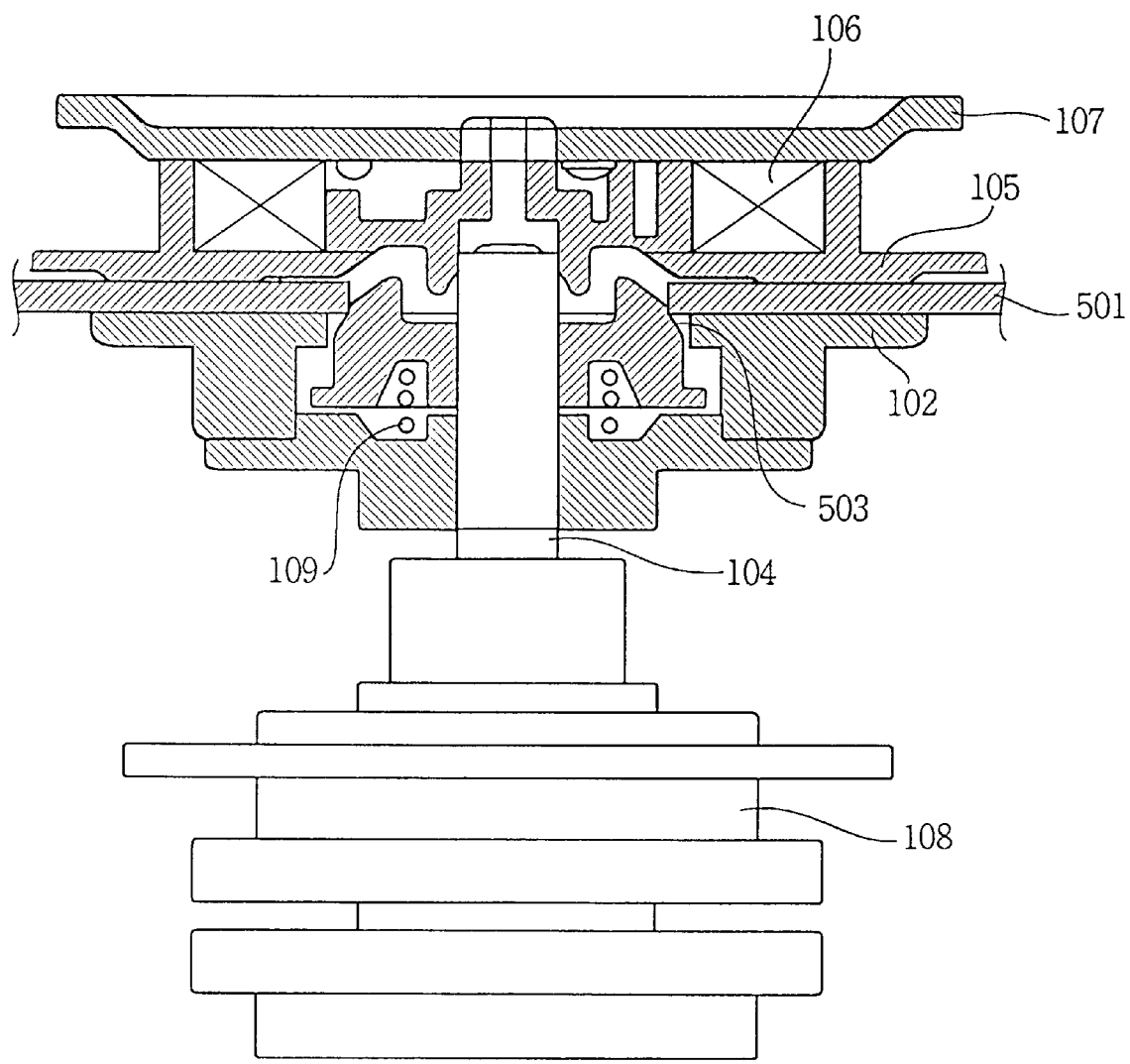

CLAMP CENTERING DEVICE OF AN OPTICAL DISC PLAYER

BACKGROUND OF THE INVENTION

The present invention relates to a clamp centering device provided in an optical disc player for centering an optical disc, and more particularly to a clamp centering device for a double-sided optical disc.

There is a certain type of optical disc (for example, a video disc) which comprises two discs adhered to each other at the back thereof so that the thus assembled disc has double recording surface, namely side A and side B. In order to reproduce both the sides A and B, an optical pickup is provided to be moved to the respective sides. Thus, once the assembled disc is set on a turntable of a disc player, the double side can be continuously played by the pickup so that the user need not bother to flip over the disc.

However, when adhering the two discs, center holes thereof may not always accurately coincide with each other. In order to correct the deviation of the assembled disc on the turntable, Japanese Utility Model Application No. 63-8852 discloses a centering device. The centering device has a pair of centering mechanisms, each for one of the sides A and B, and one of the mechanisms is selectively operated depending on the side to be played. Furthermore, Japanese Patent Application No. 6-129727 discloses a centering device having a complicated structure.

The video disc is usually employed with the adhered double-sided disc. In a video disc player in which an optical pickup is provided only on an underside portion of the disc, the clamp centering device is provided to center a center hole of a lower side disc only. In a double-sided disc player in which an optical pickup is moved to both sides of the disc, the centering device has two centering mechanisms for both sides.

On the other hand, the recording density of the recording medium has been increased. In an adhered multi-layered disc such as a DVD having a compact size and a high density of the signal pit, it is necessary to heighten the accuracy of the centering mechanism. Additionally, it is an important factor to reduce manufacturing cost of the player. In particular, since the diameter of the multi-layered disc is smaller than the laser disc, the diameter of the center hole is small. Thus, the quality of the centering mechanism may affect the player.

FIG. 5 shows a conventional centering device for centering a double-sided disc 501 comprising a lower side disc and an upper side disc. The centering device has a hollow turntable 102 on which the disc 501 is set. The turntable 102 is fixedly mounted on a rotating shaft 104. The rotating shaft 104 is connected to a spindle motor 108. A centering hub 503 is axially slidably mounted on the rotating shaft 104 inside the turntable 102. A spring 109 is provided between the bottom surface of the turntable 102 and the lower end of the centering hub 503, thereby engaging the centering hub 503 with the center hole of the disc 501. The centering device further has a clamper 105 which cooperates with the turntable 102 to clasp the disc 501 therebetween. On an upper portion of the clamper 105, a magnet 106 and a back yoke 107 are provided. By the clamper 105, magnet 106, back yoke 107 and turntable 102, a magnetic circuit is formed so as to attract the disc 501 to the turntable 102. The turntable 102 is rotated by the spindle motor 108 through the rotating shaft 104.

When playing the disc 501, the center hole of the disc 501 is carried to a position above the center of the centering hub 503 by a disc tray (not shown), and then the disc is lowered on the centering hub. At that time, the disc is lowered, sliding the inside wall of the center hole of the disc on an upper slant of the centering hub. Thereafter, the disc is pushed toward the turntable 102 by the clamper 105. The disc 501 and the centering hub 503 are lowered together to the turntable 102, while the lower periphery of the inside wall of the center hole is engaged with the slant of the centering hub 503. Thus, the disc 501 is clamped on the turntable 102 by the clamper 105 to be interposed between the clamper and the turntable. In this state, the disc 501 is so positioned that the lower side disc is centered by the slant of the centering hub 503. As a result, the upper side disc of the disc 501 is not centered.

In such a structure, when recording or reproducing the upper and lower side discs without flipping over the disc 501, if the upper side disc is largely deviated from the center, inconvenience may occur.

In order to prevent the inconvenience, the above described double centering mechanism has been proposed for both sides.

SUMMARY OF THE INVENTION

An object of the present invention is to provide a clamp centering device of an optical disc player for a double-sided optical disc wherein influence caused by the deviation of the adhered disc can be reduced with a simple mechanism.

According to the present invention, there is provided a clamp centering device of an optical disc player for centering an adhered double-sided optical disc which is formed by adhering a first disc and a second disc with each other at both sides thereof so that recorded surfaces are formed on both surfaces of the double-sided optical disc.

The device comprises a turntable secured to a rotating shaft, a clamper for clamping the double-sided optical disc together with the turntable, a centering hub mounted on the rotating shaft, the centering hub having a first engaging cylindrical portion and a second engaging cylindrical portion surface of which is located axially inside the first engaging cylindrical portion, and each of both of the engaging cylindrical portions having a diameter so as to be engaged with an inside wall of a center hole of each of the first and second discs.

An inclining angle ($\alpha$) of the first engaging cylindrical portion with respect to a vertical plane to an axis of the centering hub is larger than an inclining angle ($\beta$) of the second engaging cylindrical portion with respect to the vertical plane to the axis.

The centering hub is axially slidably mounted on the rotating shaft and disposed in a space formed in the turntable.

One of the first and second discs which is disposed at the side of the centering hub is centered by the second engaging cylindrical portion.

When a minimum diameter of a penetrating hole of the adhered double-sided optical disc is DT, a maximum diameter of the first disc is DL, and a diameter of the centering hub at a level corresponding to the adhered surface of the first and second discs is DH, the diameter DH is expressed as follows:

$$2 \cdot DT - DL < DH \leq DT.$$

Furthermore, when the thickness of the double-sided disc is t, the angle ($\alpha$) is expressed as follows:

$$\tan^{-1}\{t/2/(DT-DH)\} < \alpha \leq 90°.$$

BRIEF DESCRIPTION OF DRAWINGS

FIG. 5 is a sectional view showing a conventional centering device.

DETAILED DESCRIPTION OF THE PREFERRED EMBODIMENT

Figure 1:
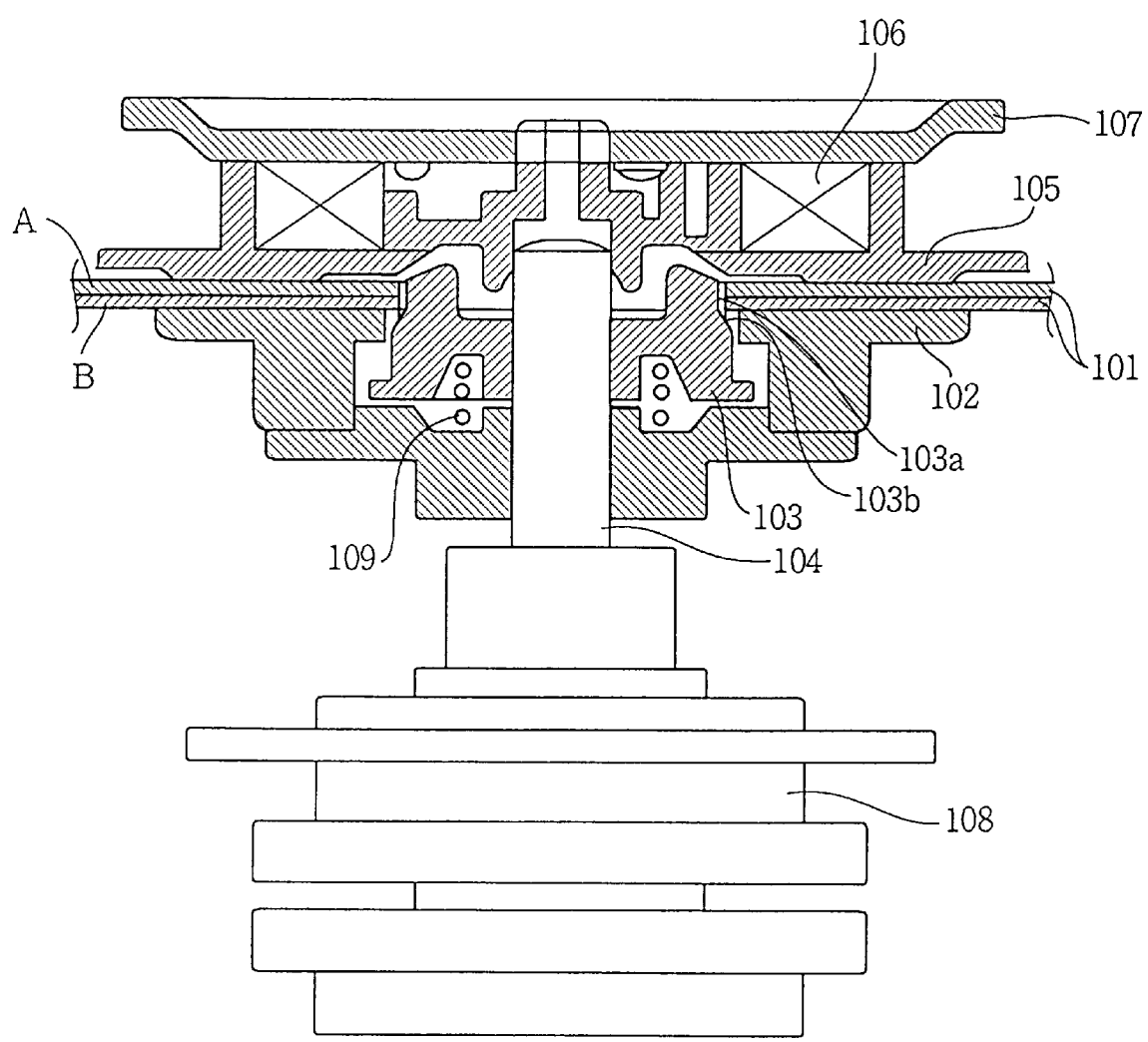
FIG. 1 is a sectional view showing a clamp centering device of an optical disc player according to the present invention.

Referring to FIG. 1 showing a clamp centering device of the present invention, structures which are the same as those of the conventional device are identified with the same reference numerals as FIG. 5, and descriptions thereof are omitted.

An adhered double-sided disc 101 comprises an upper side disc A and a lower side disc B. A centering hub 103 has two inclined guide portions for centering the disc 101 at the center hole thereof. The inclined guide portions comprises an upper tapered engaging slant 103a as a first engaging surface to be engaged with the center hole of the upper side disc A and a lower tapered engaging slant 103b as a second engaging surface engaged with the center hole of the lower side disc B.

The upper tapered slant 103a is inclined at an angle α (FIG. 4) about 90 degrees with respect to a vertical plane to the axis of the centering hub 103. The lower tapered slant 103b is inclined at an angle β (FIG. 4) with respect to the vertical plane to the axis.

Figure 2:
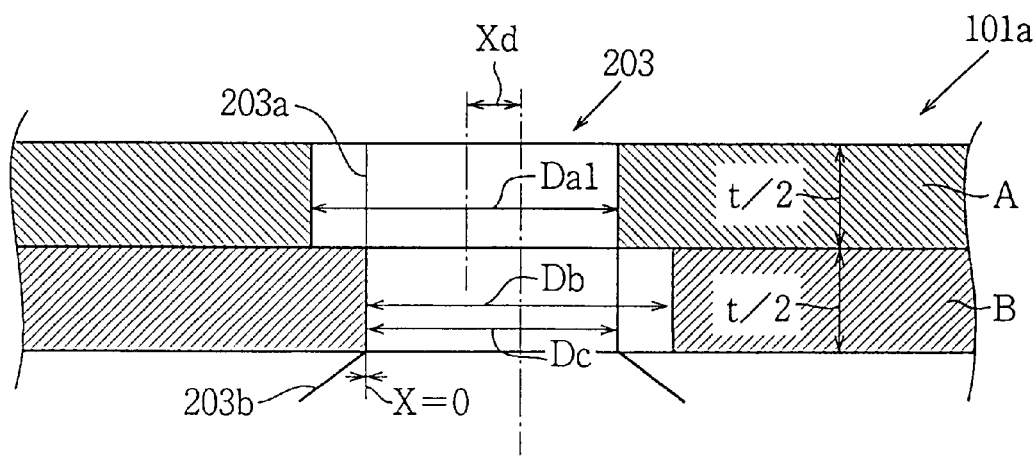
FIGS. 2a and 2b are enlarged sectional views showing examples of the operation of the clamp centering device for explaining centering operations.
Figure 2:
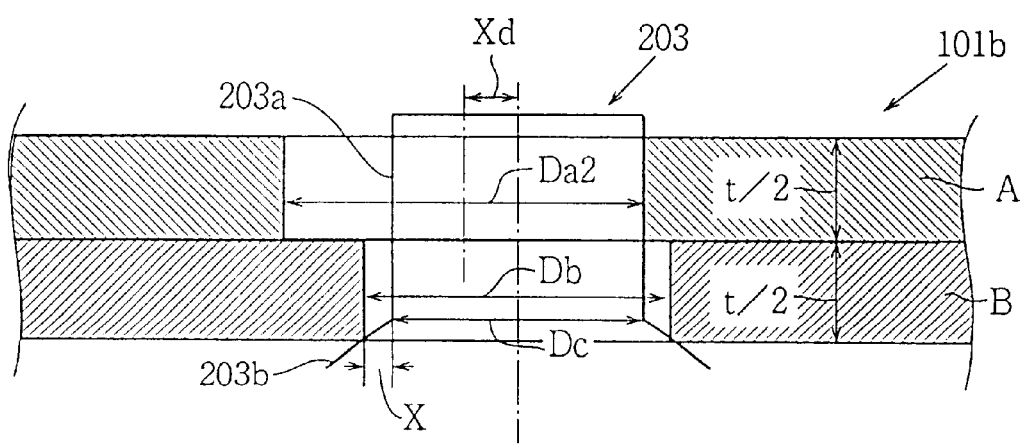

FIGS. 2a and 2b show relationships between the upper and lower tapered slants of the centering hub and the center holes of the disc.

Adhered double-sided discs 101a and 101b have an upper side disc A and a lower side disc B, respectively. A centering hub 203 has an upper tapered slant 203a as a first engaging surface to be engaged with the center hole of the upper side disc A and a lower tapered slant 203b as a second engaging surface engaged with the center hole of the lower side disc B.

If the diameter of the centering hub 203 at the upper tapered slant 203a is represented by Dc, the diameter of the center hole of the upper side disc A of FIG. 2a is Da1, the diameter of the center hole of the lower side disc B of FIG. 2a is Db, the relative deviation of the center holes of the respective discs is Xd, and the deviation between the lower side disc B and the lower tapered slant 203b of the centering hub engaged with the lower side disc B is X, a penetrating hole formed passing through the center holes of the upper side and lower side discs of the disc 101a is represented by 0.5*(Da1+Db)−Xd. Thus, X is represented as follows:

$$X = 0.5*(Da1+Db) - Xd - Dc.$$

In figures, t represents the thickness of the adhered disc 101a or 101b.

As shown in FIG. 2a, in the adhered disc 101a, each of the upper side and lower side discs A and B has the minimum center hole in standard, and is located at a maximum deviation Xd. Thus, the diameter of the penetrating hole of the adhered disc is minimum. Therefore, the diameter Dc at the upper tapered slant 203a is equal to the diameter of the minimum penetrating hole of the adhered disc. In this state, X=0 by the above mentioned equation. Furthermore, since Da1=Db, the deviation of the peripheries of the discs is equal to the relative deviation Xd of the center holes. Therefore, the deviation of the center hole of each of the upper side disc A and the lower side disc B from the axis of the centering hub 103 is Xd/2.

In FIG. 2b, the relative deviation Xd between the center holes of the discs A and B of the adhered disc 101b is equal to that of the disc 101a of FIG. 2a. However, the upper side disc A of the disc 101b has a large center hole, the diameter Da2 of which is larger than the diameter Da1 of the upper side disc A of the disc 101a of FIG. 2a.

In such a disc, the disc 101b is further axially lowered along the upper slant 203a compared with the disc 101a, since the diameter Da2 is larger than the diameter Da1. The disc 101b is lowered to the position where the lower periphery of the center hole of the lower side disc B is entirely engaged with the lower slant 203b, or a part of the periphery of the center hole of the upper side disc A is engaged with the upper slant 203a. FIG. 2b shows the condition of both engagements at the same time. Thus, the lower side disc B is centered, while the upper side disc A is not centered. The centering deviation is Xd.

When the lower tapered slant 203b is engaged with the lower periphery of the center hole of the lower side disc B, the lower side disc B is centered, as described in the conventional device. However, the upper side disc A is not centered.

When a part of the lower slant 203b is engaged with a side of the center hole of the lower side disc B, while a part of the upper slant 203a is engaged with the other side of the center hole of the upper side disc A, the centering deviation of the upper side disc A is corrected by a shortage amount of the centering of the lower side disc B. Thus, the maximum centering deviation is Xd/2.

Figure 3:
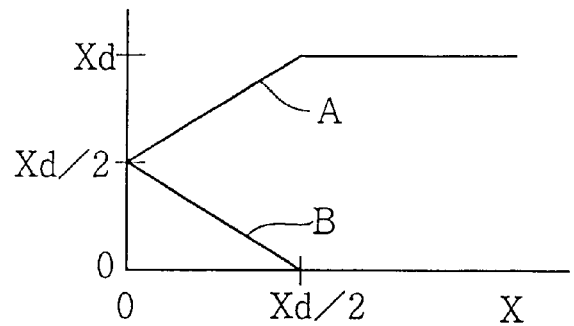
FIG. 3 is a diagram showing centering deviation of the clamp centering devices of FIGS. 2a and 2b.

FIG. 3 shows the graph of the deviation of centering as aforementioned.

Namely, when X=0, the center holes of the upper side and lower side discs A and B are engaged with the upper slant 203a of the centering hub as shown in FIG. 2a. In this state, the angle α is 90 degrees, namely, since the centering hub 203 is a cylindrical shape at the upper slant 203a, the penetrating hole is the minimum, and Da1−Xd=Db−Xd=Dc. The upper side and lower side discs A and B share the centering deviation of Xd/2, respectively.

If the diameter of the center hole of the upper side disc A is increased, and the difference X of the lower side disc is X=Xd/2, since the center hole of the lower side disc B is engaged with the entire surface of the lower slant 203b as shown in FIG. 2b, the centering deviation of the lower side disc is zero as shown in FIG. 3. On the other hand, the upper side disc A is not engaged with centering hub after X=Xd/2, the centering deviation of the upper side disc A increases and becomes equal to the adhered deviation of Xd. Thereafter, the centering deviation is kept constant (Xd).

Consequently, the centering deviations of discs A and B change complementarily as shown in FIG. 3.

Concretely, in a compact disc (CD), if the diameter of the minimum penetrating hole of the adhered disc is 14.90 mm, and the maximum adhered deviation is 0.20 mm, in the conventional centering device, the maximum centering deviation of the upper side disc is 0.2 mm. However, in the present invention, it is possible to reduce the centering deviation between 0.1 and 0.2 mm. Since the probability of adhered deviation is small, a substantial effect can be expected.

In the above described explanation of present invention, although the upper slant 103*a* or 203*a* has 90 degrees, the angle can be changed under the hereinafter described relationship.

Figure 4:
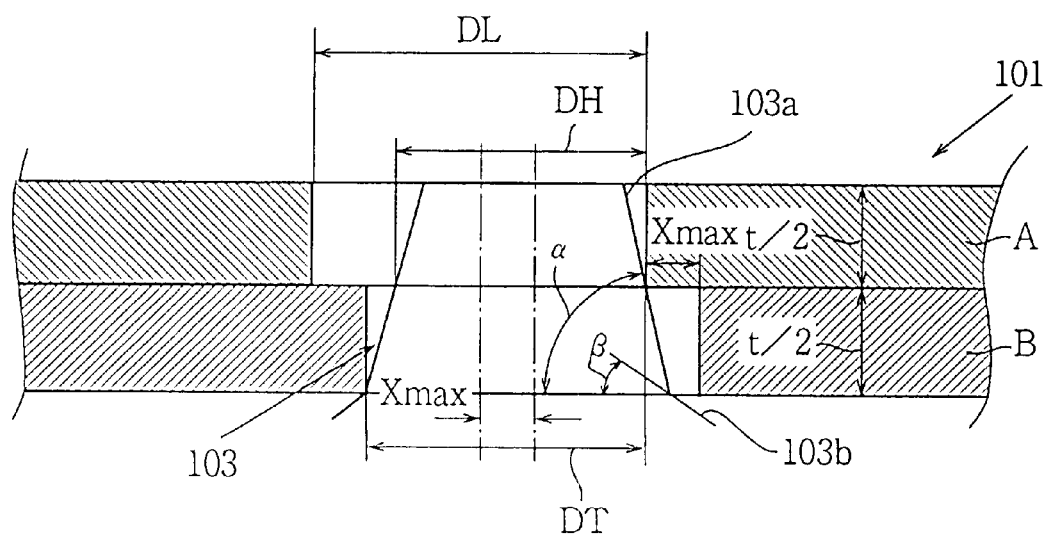
FIG. 4 is an enlarged sectional view showing the clamp centering device of FIG. 1.

FIG. 4 shows a relationship between the upper and lower slants of the centering hub and the center hole of the adhered disc of FIG. 1. In the figure, t is the thickness of the disc 101, DT is the minimum diameter of the penetrating hole of the disc, DL is the maximum diameter of the upper side disc A before adhered to the lower side disc B, and DH is the diameter of the centering hub 103 at a level corresponding to the adhered surface of the upper side and lower side discs when the lower slant 103*b* is engaged with the entire surface of the center hole of the disc.

It will be seen that in order to engage the disc 101 with the centering hub 103, the diameter DH of the centering hub 103 must be smaller than the penetrating hole DT. Thus, DH≦DT is determined. Furthermore, in order to engage the upper slant 103*a* with the upper side disc A, the difference DT−DH must be smaller than the difference DL−DT even if the penetrating hole is the minimum.

Thus, DT−DH<DL−DT is determined, and it is necessary to satisfy a relationship as follows:

$$2 \cdot DT - DL < DH \leq DT.$$

Furthermore, the relationship between DH, DT and t is determined as follows:

$$(DT-DH) \cdot \tan \alpha > t/2.$$

Thus, $$\tan^{-1}\{t/2/(DT-DH)\} < \alpha$$

As a result, the angle $\alpha$ is 90 degrees at maximum.

From the foregoing, the aforementioned effect is obtained when 2·DT−DL<DH≦DT, and angles $\alpha$ and $\beta$ are $\tan^{-1}\{t/2/(DT-DH)\} < \alpha \leq 90°$ and $\beta < \alpha$.

In accordance with the present invention, since the upper side disc and the lower side disc share complementarily the centering deviation, the centering deviation is reduced in average, thereby assuring a stable reproduction of the disc.

While the invention has been described in conjunction with preferred specific embodiment thereof, it will be understood that this description is intended to illustrate and not limit the scope of the invention, which is defined by the following claims.

What is claimed is:

1. A clamp centering device of an optical disc player for centering an adhered double-sided optical disc which is formed by adhering a first disc and a second disc with each other at both sides thereof so that recorded surfaces are formed on both surfaces of the double-sided optical disc, the device comprising:

a turntable secured to a rotating shaft;

a clamper for clamping the double-sided optical disc together with the turntable; and a centering hub mounted on the rotating shaft, the centering hub having a first engaging cylindrical portion and a second engaging cylindrical portion integral with the first engaging cylindrical portion, a surface of the second engaging cylindrical portion being located axially inside the first engaging cylindrical portion, and each of both of the engaging cylindrical portions having a diameter so as to be engaged with an inside wall of a center hole of each of the first and second discs, an inclining angle ($\alpha$) of the first engaging cylindrical portion with respect to a vertical plane to an axis of the centering hub being larger than an inclining angle ($\beta$) of the second engaging cylindrical portion with respect to the vertical plane to the axis whereby the first and second engaging cylindrical portions are configured such that at least a portion of the first engaging cylindrical portion and/or the second engaging cylindrical portion contact at least portions of both inside wall center holes of the first and second discs simultaneously when loaded upon the centering hub to thereby center the first and second disc of the adhered double-sided optical disc.

2. The clamp centering device according to claim 1 wherein the centering hub is axially slidably mounted on the rotating shaft and disposed in a space formed in the turntable.

3. The clamp centering device according to claim 1 wherein one of the first and second discs which is disposed at the side of the centering hub is centered by the second engaging cylindrical portion.

4. The clamp centering device according to claim 1 wherein when a minimum diameter of a penetrating hole of the adhered double-sided optical disc is DT, a maximum hole diameter of the first disc is DL, and a diameter of the centering hub at a level corresponding to the adhered surface of the first and second discs is DH, the diameter DH is expressed as follows:

$$2 \cdot DT - DL < DH \leq DT.$$

5. The clamp centering device according to claim 4 wherein when a thickness of the double-sided optical disc is t, the angle ($\alpha$) is expressed as follows:

$$\tan^{-1}\{t/2/(DT-DH)\} < \alpha \leq 90°.$$

* * * * *